United States Patent [19]
Hudson

[11] Patent Number: 4,911,270
[45] Date of Patent: Mar. 27, 1990

[54] CHOCK FOR WHEELED VEHICLE

[76] Inventor: Timothy S. Hudson, 2832 Mt. Harmony Rd., Matthews, N.C. 28105

[21] Appl. No.: 314,461

[22] Filed: Feb. 22, 1989

[51] Int. Cl.⁴ .................................................. B60T 3/00
[52] U.S. Cl. ........................................................ 188/32
[58] Field of Search ............................. 188/32, 36, 4 R

[56] References Cited

U.S. PATENT DOCUMENTS

| | | | |
|---|---|---|---|
| 1,598,741 | 9/1926 | Nelson | 188/32 A |
| 1,915,320 | 6/1933 | Jones | 188/32 A |
| 2,007,514 | 7/1935 | Wilson et al. | 188/32 A |
| 2,521,539 | 9/1950 | Richardson | 188/32 |
| 2,723,005 | 11/1955 | Wink | 188/32 |
| 2,810,459 | 10/1957 | Nitz | 188/32 |
| 2,817,301 | 12/1957 | Tregoning | 188/30 X |
| 2,851,127 | 9/1958 | Smith | 188/32 |
| 3,297,111 | 1/1967 | Lisboa | 188/32 |
| 3,542,157 | 11/1970 | Noah | 188/32 |
| 3,734,241 | 5/1973 | Hale | 188/32 |
| 3,858,690 | 1/0775 | Facemire | 188/32 |
| 3,993,167 | 11/1976 | Reed | 188/32 |
| 4,034,961 | 7/1977 | Breen | 188/32 X |

FOREIGN PATENT DOCUMENTS 1250144 11/1960 France ................................ 188/32

*Primary Examiner*—George E. A. Halvosa
*Attorney, Agent, or Firm*—Bell, Seltzer, Park & Gibson

[57] ABSTRACT

A chock for preventing the rolling movement of a vehicle wheel is provided. The chock comprises a body having an upstanding humped portion having opposing forwardly and rearwardly sloping surfaces for the passage of a wheel of a vehicle therealong, an upstanding wheel abutment portion spaced rearwardly from the rearwardly sloping surface of the humped portion and a recessed wheel receiving portion positioned between the humped portion and the wheel abutment portion and interconnecting the rearwardly sloping surface of the humped portion with the wheel abutment portion.

1 Claim, 1 Drawing Sheet

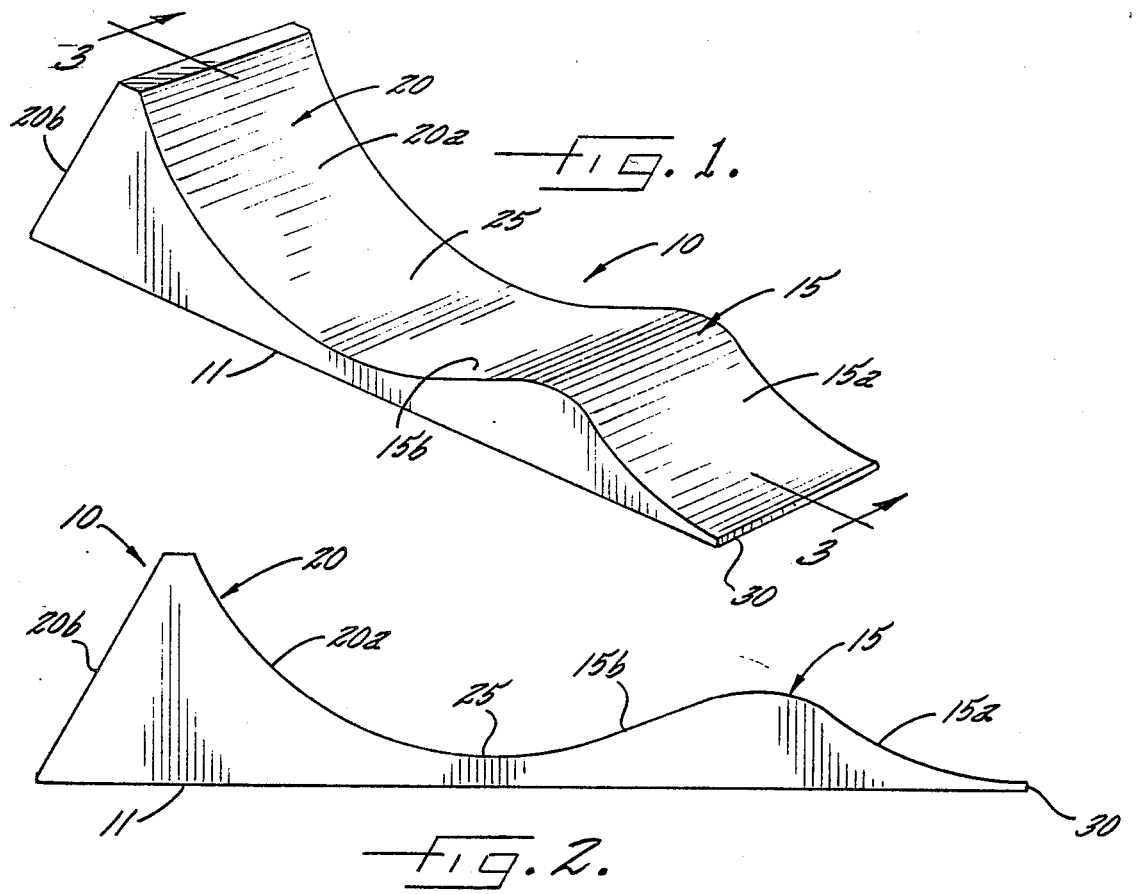
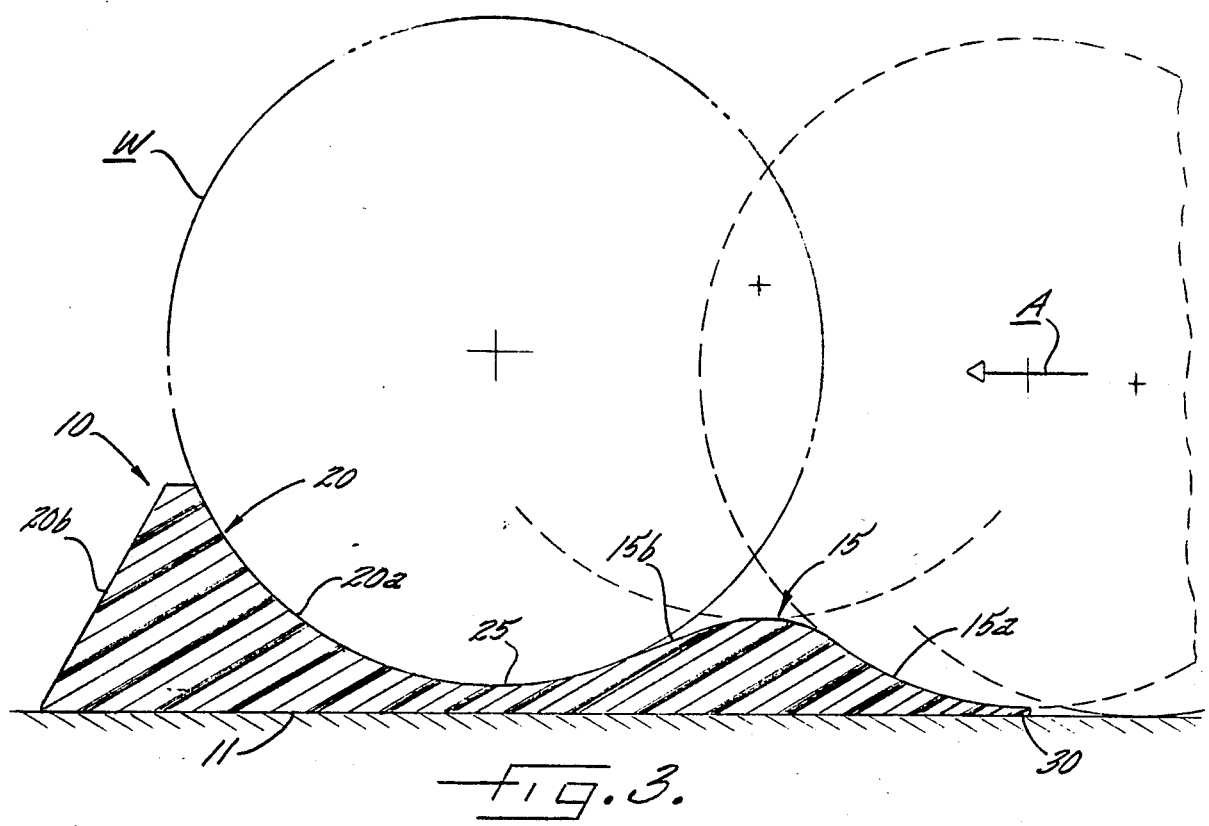

CHOCK FOR WHEELED VEHICLE

FIELD AND BACKGROUND OF THE INVENTION

This invention relates to a chock for blocking the movement of a wheel of a vehicle or trailer for preventing movement thereof More particularly this invention relates to a chock which may be simply and inexpensively manufactured.

It is generally know that it is quite dangerous to attempt to jack up one wheel of a vehicle for changing a tire or for repairs, and the emergency brake alone is not sufficient to prevent movement of the vehicle. Thus various chocks are available which recognize the need for a convenient way of blocking a wheel when one end of a vehicle is raised. Exemplary chocks are disclosed in U.S. Pat. No. 2,521,539 to Richardson, U.S. Pat. No. 2,851,127 to Smith, and U.S. Pat. No. 3,734,241 to Hale. These patents show chock designs where the weight of the vehicle prevents the chock from slipping and also prevents tampering of the chock while unattended such as by children removing the chock.

Such chocks are complicatedly fabricated from metal and have substantial disadvantages. Fabricating metal is expensive and the designs are complex thus the cost of the chocks is high. Therefore there is reluctance by the consumer to purchase these chocks because of price.

It is, therefore, an object of the invention to provide a chock which in inexpensive to manufacture.

It is another object of the invention to provide a chock which can be simply and inexpensively manufactured by modern plastic molding techniques.

It is a further object of the invention to provide a chock which is easy to use and which will securely hold the wheel and will not readily slip.

SUMMARY OF THE INVENTION

In accordance with the present invention, applicant provides a chock for blocking the rolling movement of a wheel on a vehicle to prevent movement of the vehicle. To this end, the chock comprises an integrally formed body having an upstanding humped portion having opposing forwardly and rearwardly sloping surfaces for the passage of a wheel of a vehicle therealong, an upstanding wheel abutment portion spaced rearwardly from the rearwardly sloping surface of the humped portion and of a height greater than said humped portion and adapted to abuttingly engage the wheel of a vehicle, and a recessed wheel receiving portion positioned between the humped portion and the wheel abutment portion and interconnecting the rearwardly sloping surface of the humped portion with the wheel abutment portion.

BRIEF DESCRIPTION OF THE DRAWINGS

The foregoing and other objects, features and advantages of the present invention will be made apparent from the following detailed description of the preferred embodiment of the invention, and from the drawings, in which:

FIG. 1 is a perspective view of the present chock;
FIG. 2 is a side view of the chock; and
FIG. 3 is a cross-sectional view taken along lines 3—3 of FIG. 1.

DETAILED DESCRIPTION OF THE INVENTION

A chock which blocks the rolling movement of a vehicle wheel is illustrated in the Figures and is broadly designated by the reference numeral 10.

As illustrated, the chock 10 comprises an integrally formed body. The chock is preferably of solid construction formed of a durable and rigid molded plastic material which resists deformation caused by the weight of a vehicle wheel on it. Exemplary plastics may include PVC, ABS resins, polyesters, polyethylene, polypropylene and the like.

The chock 10 is adapted to receive different size wheels such as those present on cars, small trucks, or trailers, and is adapted to be used on flat surfaces or surfaces having a maximum incline of less than 20°. The chock is typically at least about twenty inches long and at least seven inches wide.

The chock 10 generally comprises a humped portion 15, an upstanding wheel abutment portion 20 and a recessed wheel receiving portion 25 located between the humped portion 15 and the wheel abutment portion 20. Additionally, the chock 10 has a substantially flat bottom ground engaging surface 11. The upstanding humped portion 15 of the body has opposing forwardly and rearwardly sloping surfaces 15a, 15b respectively. As shown in FIG. 3 by the dotted outline of a wheel W, the humped portion 15 permits the passage of a wheel W therealong in direction A to be received in the recessed wheel receiving portion 25.

The humped portion 15 may also include a nose portion 30 formed integral therewith extending forwardly from the lower portion of the forwardly sloping surface 15a of the humped portion 15. The nose portion 30 is relatively thin and facilitates movement of a wheel W of a vehicle onto and over the humped portion 15.

An upstanding wheel abutment portion 20 prevents the wheel from moving beyond the recessed wheel receiving portion 25 after the wheel W has passed over the humped portion 15. As illustrated, the upstanding wheel abutment portion 20 is spaced rearwardly from the rearwardly sloping surface 15b of the humped portion 15 and has a forwardly sloping upper surface portion 20a merging with rearwardly sloping surface 15b of humped portion 15. An upright forwardly extending abutment portion 20b defines the rear end of the chock 10 and serves to stabilize the chock 10 and prevents it from being tilted or raised when the wheel is moved onto the chock and against the abutment. Additionally, the abutment portion 20 preferably is of a height greater than the humped portion 15 and preferably is of a height of at least twice as great as the humped portion 15. It has been determined that a height of about seven inches for the abutment portion 2 as compared to three inches for the humped portion 15 is suitable.

In the drawings and specification, there has been disclosed a preferred embodiment of the invention and, although specific terms are employed, they are used in a generic and descriptive sense only and not for the purpose of limitation, the scope of the invention being set forth in the following claims.

That which I claim is:

1. A chock for blocking the movement of a wheel on a vehicle to prevent movement of the vehicle, said chock comprising a solid rigid plastic body having a substantially flat uninterrupted bottom ground engaging surface of multiple inches in width and length, an uninterrupted upper surface including a solitary upstanding humped portion having opposing forwardly and rearwardly sloping surfaces for the passage of a wheel of a vehicle therealong, a nose portion connected to and extending forwardly from the lower portion of said forwardly sloping surface of said humped portion, said nose portion being relatively thin to facilitate movement of a wheel of a vehicle onto and over said humped portion, an upstanding wheel abutment portion extending rearwardly from said rearwardly sloping surface of said humped portion adapted to abuttingly engage the wheel of a vehicle, said abutment portion being of a height at least twice as great as said humped portion and including a forwardly sloping upper surface portion substantially merging with said rearwardly sloping surface portion of said humped portion and an upright forwardly extending portion for stabilizing the chock, and a recessed wheel receiving portion positioned between said humped portion and said wheel abutment portion and interconnecting said rearwardly sloping surface of said humped portion with said wheel abutment portion, said wheel receiving portion adapted to receive the weight of the wheel of a vehicle resting thereon to prevent the chock from being displaced.

* * * * *